Aug. 17, 1965    E. W. YOUNG    3,201,756

MAGNETIC PULSE GROUP DECODER

Filed July 18, 1962    3 Sheets-Sheet 1

INVENTOR

Edward W. Young,

BY Paris, Haskell, and Levine

ATTORNEYS

INVENTOR
Edward W. Young
BY Paris, Haskell, and Levine
ATTORNEYS

INVENTOR
Edward W. Young,
BY Paris, Haskell, and Levine
ATTORNEYS

United States Patent Office 3,201,756
Patented Aug. 17, 1965

3,201,756

MAGNETIC PULSE GROUP DECODER

Edward W. Young, Trevose, Pa., assignor, by mesne assignments, to United Aircraft Corporation, a corporation of Delaware Filed July 18, 1962, Ser. No. 210,692
10 Claims. (Cl. 340—164)

Figure 1:
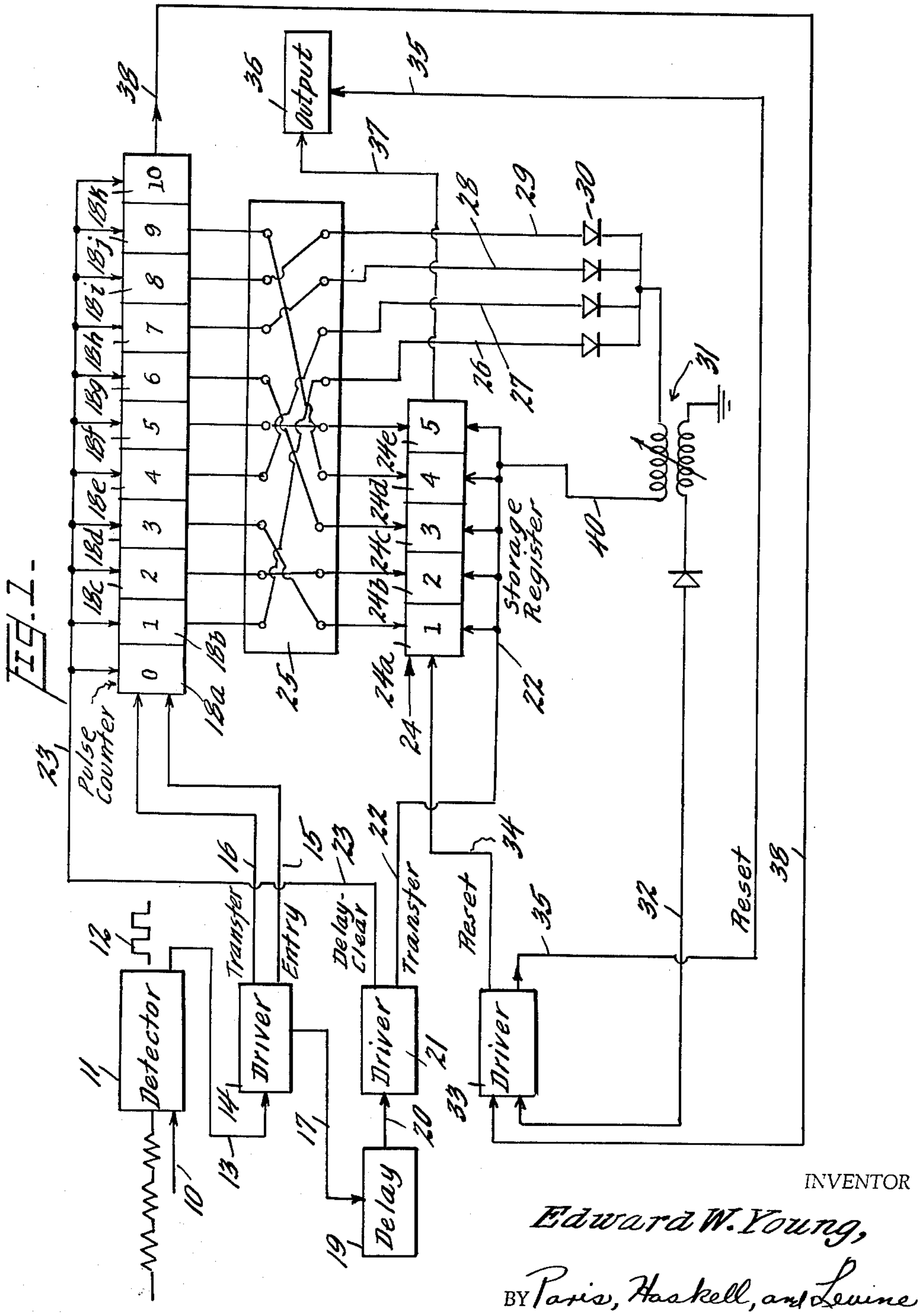

This invention relates generally to pulse code analyzers or decoders and more particularly to digital decoders for recognizing predetermined codes of electrical pulses and producing an output signal when the correct code of pulses has been received. The invention is particularly useful for remote telemetering communications and control functions, but is not limited to such applications.

Very generally according to the invention, there is provided a sequentially operating decoder for successively receiving groups of impulses corresponding to individual digits of a multidigit number and responding to a predetermined multidigit number only if the individual digits of the code received are correct and are received in the correct sequence. In operation, the pulses of each group received are summed in a pulse counter to provide a number indication corresponding to that digit and this number is either entered or rejected by means of a novel storage register depending upon whether this number is correct and has been received in the correct sequence. This storage register is interconnected with the counter in a predetermined fashion for each preselected code, which connections may be easily changed, by such means as a detachable plug-in connector unit, to enable the code to be easily varied as desired. The pulse code selected may be in the decimal or other number system and the radix or number system employed may also be easily varied without extensive changes in the circuitry. Due to the versatility of the circuit, the number of digits in the preset code may also be easily changed by merely adding or deleting individual stages to the storage register.

The preferred circuitry is comprised of a minimum number of solid state and magnetic components, of small size and light weight, and is particularly adapted to be embodied in miniaturized circuit housings as may be desired for many applications.

It is accordingly a principal object of the invention to provide a pulse code analyzer or decoder of reduced weight and size, and minimum power consumption.

A further object of the invention is to provide a pulse decoder that is easily presettable to recognize different pulse codes.

Another object of the invention is to provide an improved pulse decoder that is easily adaptable for use in recognizing short code numbers having either few digits or long code numbers with many digits, by but minor changes in the circuitry.

Still another object of the invention is to provide a decoder circuit that is automatically resettable if an incorrect code of pulses is received, or that may be reset under control of an operator; or alternatively may be reset by a combination of automatic and manually controllable means.

A still further object is to provide such a decoder that is particularly adaptable for packaging in a miniaturized housing, and that requires small power consumption, rendering the decoder useful for remote telemetering and other control or communication uses.

A still further object is to provide such a decoder that is substantially ambiguity-free in recognizing the code and precise in its mode of operation.

Figure 2:
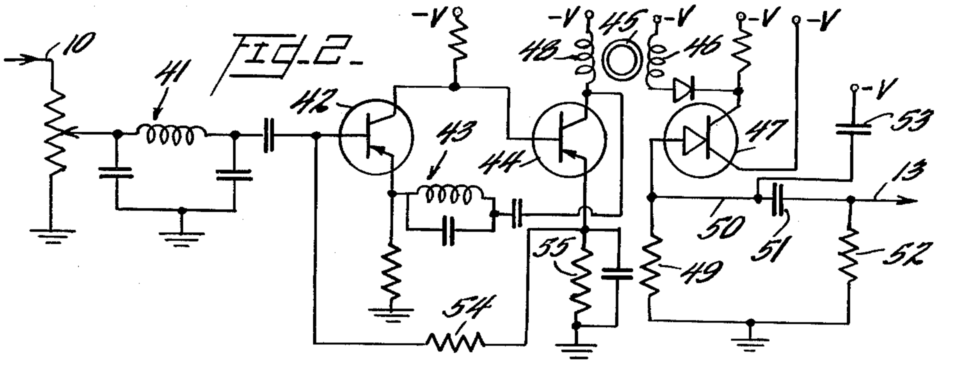
Figure 3:
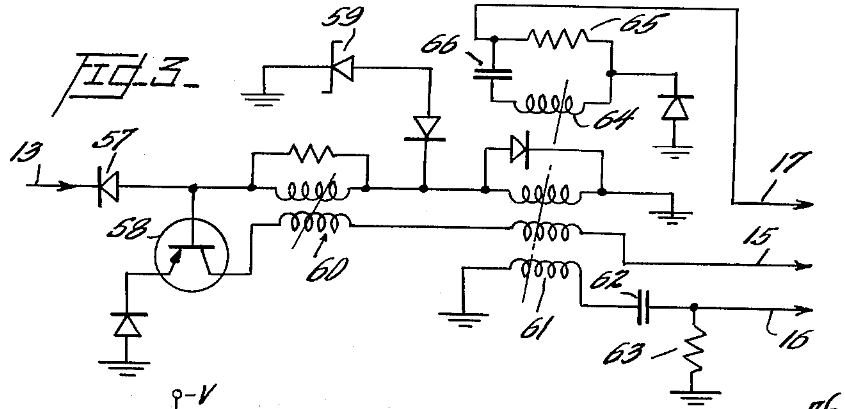
Figure 4:
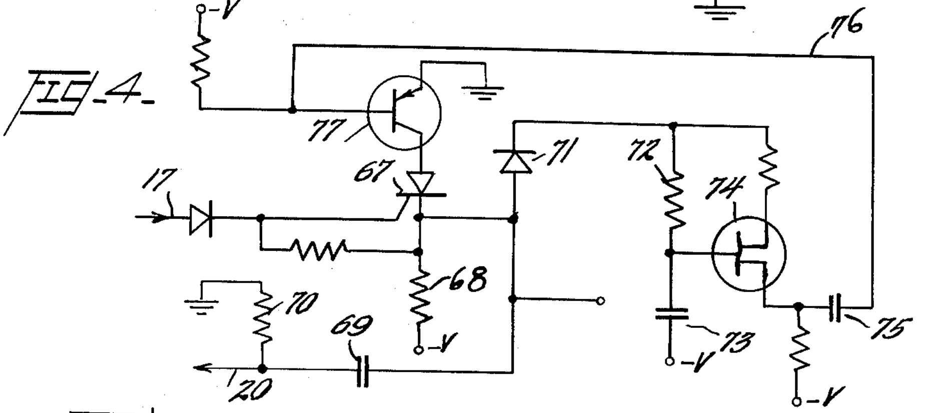
Figure 5:
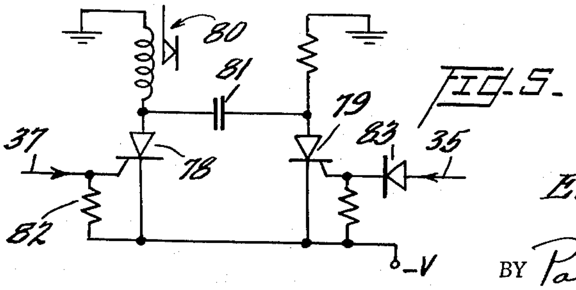
Figures 6, 7:
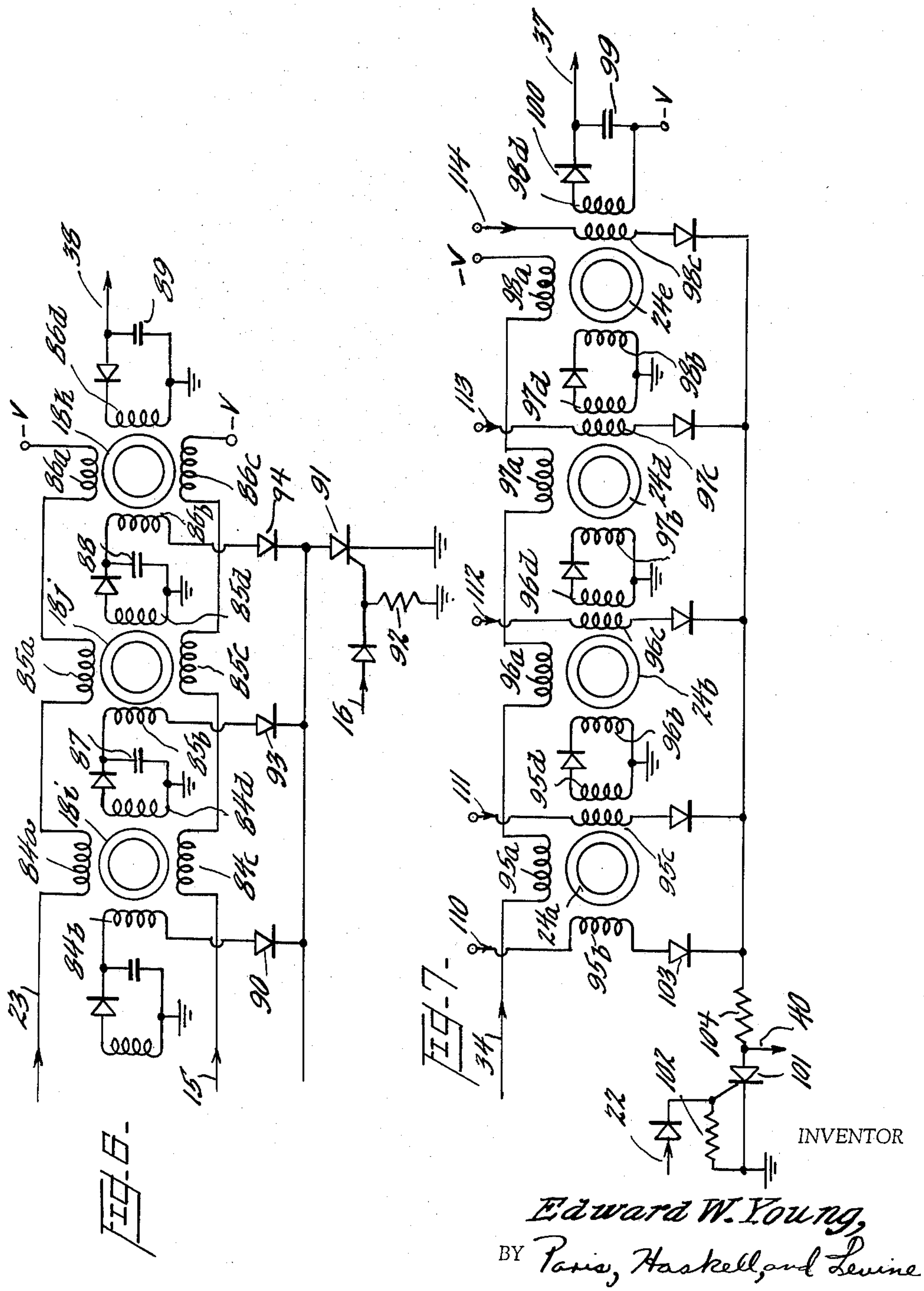

Other objects and many additional advantages will be more readily understood by those skilled in the art after a detailed consideration of the following specification taken with the accompanying drawing wherein:

FIG. 1 is a block diagram representation of a preferred decoder according to the invention, FIG. 2 is a schematic electrical diagram of a preferred input circuit for use with the decoder for converting coded tone input signals into uniform wave shape impulses for use by the decoder, FIG. 3 is an electrical schematic diagram illustrating a preferred driver circuit that may be employed in FIG. 1, FIG. 4 is an electrical schematic diagram illustrating a preferred delay circuit as employed in the decoder of FIG. 1, FIG. 5 is an electrical schematic illustration of a preferred output circuit that may be employed in the decoder of FIG. 1, and FIGS. 6 and 7 are electrical schematic diagrams illustrating a preferred magnetic counter circuit and a preferred storage register circuit as may be employed in the decoder of FIG. 1.

Referring now to the drawings there is shown in FIG. 1 a decoder circuit for analyzing a five digit number wherein each of the digits received is in the form of a group of impulses whose sum equals the digit of the number in the decimal system. Thus, if five impulses are first received, the first digit of the number is in this case, the number 5. The circuit receives each of these digits in succession and is preset to recognize and respond only to a predetermined five digit number code, with each of the digits of the code being received in the correct sequence.

It will become evident, however, as the specification proceeds, that the invention is not limited to operation in the decimal system, nor is it limited to any particular number of digits but may be easily revised to recognize either a greater or lesser number of digits in a preset code.

Returning to FIG. 1, the signal carrying the group of impulses is initially directed over input line 10 to a detector 11 where the impulses are detected by the detector unit 11 and thence transmitted over line 13 to a driver circuit 14 for producing impulses of uniform wave shape over line 15. The driver circuit directs these impulses to a multistage counter 18, comprising serially connected stages 18*a* to 18*k*, where the pulses of this group are summed by stepping the counter, stage by stage, for each impulse received. Thus after each group of impulses is received, the last stage of the counter 18 that is operated corresponds to the decimal number of pulses received in that group.

For determining whether the digit received corresponds to a code digit preset in the decoder, there is provided a storage register 24, having five stages 24*a* to 24*e* inclusive, each corresponding to a different digit of the preset code; and a matrix, indicated at 25, for interconnecting the different stages of the storage register 24 with preselected ones of the stages of the counter 18.

As will be observed, the matrix 25 interconnects the first stage of the storage register 24*a* to the third stage of the counter 18*d*, the second stage of the storage register 24*b* to the second stage of the counter 18*c* and so forth, whereby it will be observed that the various stages of the storage register 24 in the example of FIG. 1 are interconnected to respond to a preset code number 32695.

Thus if the sum of the first group of impulses received is the correct number 3, the first stage 24*a* of the storage register 24 receives an energization from stage 18*b* of the counter, signifying that the first digit received is correct.

After this first received digit has been found correct and a pulse has been stored in the first stage 24*a* of the storage register, the pulse counter 18 is then automatically cleared in preparation for receiving the next group of impulses corresponding to the second digit of the number. This is performed by means of a second driver circuit 21 which is energized after a time delay to produce a clear pulse over line 23 to reset or clear all of the stages of the pulse counter 18. The driver 21 is triggered into operation by a delay circuit 19 which, in turn, is energized by the first driver circuit 14.

As will be recalled, the first driver circuit 14 receives each of the incoming pulses and produces uniform pulses over line 15 for entry into the pulse counter 18. Upon receiving the first pulse of each group, the driver circuit 14 also produces a pulse over line 17 to the delay circuit 19. The delay circuit 19, serves to delay this impulse for a sufficient period of time to enable all of the impulses of the group received to be entered into the counter 18, and after this has been accomplished, the delay circuit 19 triggers the second driver circuit 21 into operation to produce a clear impulse over line 23 to clear the stages of the counter 18 as described.

In a similar manner as described, the second group of impulses is thereafter subsequently received over input line 10 and directed through the detector circuit 11 and thence over line 13 to the driver circuit 14 thereby to produce a second series of uniform impulses over line 15 to the counter 18. Again the counter 18 is stepped from stage to stage, summing these impulses as before, and the highest order stage reached corresponds to the number of impulses received in the second group. If, in this case, the number of impulses in the second group equals the correct number 2, energization is applied to the second stage **24*b* of the storage register by means of the matrix connections 25** as shown, thereby signifying that the second digit of the number received is correct.

In this same manner, each succeeding group of impulses corresponding to the next digits of the number received are counted in the multistage counter 18 and are transferred to the different stages of the storage register 24 only in the event that these numbers correspond to the numbers that have been preset by the matrix connections 25. Finally, when all five correct digits have been individually counted by the counter 18 and transferred to the storage register 24, the storage register 24 completes its cycle of operation and produces an output impulse on line 37 leading to the output mechanism 36. This output impulse over line 37 actuates the output circuit 36 thereby controlling the output circuit only when all five digits of the number received have been found to be correct and have been received in the correct order.

To insure that the storage register 24 functions in the manner described only when the correct number digits are received in the correct sequence, the stages **24*a* to 24*e*, inclusive, are also interconnected serially in such fashion that each stage is primed or conditioned to store the impulse received from the counter 18 only in the event that the previous stage has earlier received energization from the counter 18. For example, if the first group of impulses received over input line 10 does not correspond to the number 3 as required by the first stage 24*a* of the storage register, but instead is equal to some other number, one of the other stages of the storage register 24 may be energized instead of the first stage 24*a*. In this case, since the first stage is not energized, the second stage of the storage register 24 is not conditioned to store the second digit from the counter 18. Therefore even though the second digit received is correct, the stage 24*b* cannot be activated by the counter 18. Consequently, if the correct numbers of the preset code are received, but are not received in the correct sequence, the storage register 24 is not activated to receive these digits and after the completion of operations, the storage register 24 will not function to operate the output circuit 36**.

In various applications of pulse code analyzers, it is often desired to automatically reset the analyzer in the event that an incorrect digit is received. To provide this function, without the addition of excessive ancillary circuitry, the matrix 25 may be easily modified, as shown, to provide this function. As shown each of the remaining stages of the counter 18 may be interconnected by the matrix 25 to a different reset line such as lines 26 to 29, inclusive. These reset lines are each connected through a diode, such as 30, to a reset transformer, indicated at 31. The secondary winding of the reset transformer 31 is connected over line 32 to energize a third driver circuit 33 which in turn produces reset pulses over line 34 to reset the storage register 24.

In the event that a digit is received which does not correspond to one of the preset code digits, one of these output lines 26 to 29 receives energization from the counter 18 and transmits a pulse to the output transformer 31. This pulse activates the third driver circuit 33 to produce a pulse over line 34 to automatically reset the stages of the storage register 24.

In many applications, the presence of noise pulses or other spurious energization might render the automatic resetting circuit as undesirable and for such applications, this automatic resetting circuitry may be eliminated from the analyzer .

For manually resetting of the complete analyzer after the correct code of digits has been received, there is provided an output reset line 38 leading from the last stage of the counter 18 and over line 38 to also trigger the third driver circuit 33. As before, a pulse produced over line 38 triggers the third driver circuit 33 into operation to produce a reset or clear pulse over line 34 to reset the stages of the storage register 24 to their initial condition. For manually resetting the analyzer in this manner, an operator may actuate an external circuit (not shown) to produce a group of ten impulses over the input line 10 leading to the counter 18 which pulses step the counter to the last stage **18*k* thereof to produce the reset pulse over line 38**.

It will be noted, however, that only the storage register 24 needs to be cleared to reset the analyzer since the pulse counter 18 is automatically cleared after the entry of each group of impulses by the operation of the second driver circuit 21 as described above.

Recapitulating the operation of the circuit as described above, each group of received input impulses corresponding to a different digit of the code is summed by the pulse counter 18 to step the counter 18 to its decimal stage corresponding to the decimal sum of the impulses received. In the event that this number corresponds to the correct digit of the code, for which the analyzer has been preset, an impulse is directed to the proper stage of a storage register 24 and stored therein. Thereafter the counter 18 is automatically cleared by the second driver circuit 21 to respond to the next group of impulses received. As each succeeding group of impulses is received, the operation is the same, and in the event that the digit received corresponds to a preset digit, the next succeeding stage of the storage register 24 is energized to store an impulse until the storage register 24 has become completely filled, signfying that all digits received are correct and have been received in the correct order. Only at this time is an output pulse directed over line 37 to energize the output circuit 36. In its normal mode of operation as described, the storage register 24 is not automatically cleared, and the resetting of this register 24 is controlled under the direction of an operator who injects a series of ten impulses into the pulse counter 18. This serves to energize a third driver circuit 33 which, in turn, produces a reset impulse to clear the storage register 24 and thereby reset the analyzer to respond to the next code of pulses.

Where it is desired to automatically reset the analyzer in the event that a digit being received is not the correct digit, the matrix 25 is provided with an additional series of connections, such as lines 26 to 29 inclusive, whereby energization of any one of these lines in response to an incorrect digit received is directed to produce an impulse to the third driver 33 to reset the circuit.

At this point in the description it is believed evident that the circuit provides considerable versatility in that the preset code may be easily varied by merely changing the matrix 25 and interconnecting differently numbered stages of the counter 18 with the different stages of the storage register 24. To rapidly change the code, the matrix 25 may be provided as a series of plug-in type matrix connectors any one of which may be selectively inserted to easily and rapidly change the five digit code as desired. Alternatively, detachable matrix connections (not shown) may be provided externally on a terminal board whereby any one of a vast number of codes may be synthesized by manually changing the interconnections between the stages of the pulse counter 18 and the storage register stages 24.

It is also believed evident at this point that the decoder circuit may be very easily modified to recognize a greater or lesser number of digits in the code by merely adding or removing single stages of the storage register 24 without in any other way varying the circuitry.

More specifically, assuming that the system is operating in the decimal number system, the number of stages of the pulse counter 18 remains fixed despite the number of digits in the code to be selected, since each digit is comprised of less than ten impulses. If it is desired to preset the analyzer for a six digit code, an additional stage on the storage register 24 (not shown) may be serially connected to the last stage 24*e*; and by means of the matrix 25, this added stage may be connected to the desired one of the stages of the pulse counter 18 corresponding to the sixth preset digit. Thus by the simple addition of one stage to the storage register 24, the circuit may be revised to respond to a six digit code instead of a five digit code. Similarly, if only a four digit code is desired, the last stage 24*e* of the storage register 24 may be disconnected and the output line 37 may be taken from the preceding stage 24*b*. In this manner, by the removal of only one stage of the storage register 24, the circuit can be modified to recognize any desired four digit code.

According to the invention, it is preferred to employ magnetic circuitry for the pulse counter 18 and for the storage register 24 for the purpose of reducing the power consumption of the circuit as well as increasing its reliability. For this reason, the driver circuits 14 and 21 are provided with a pair of output lines instead of a single line as described above, which pair of lines perform the functions described. For example, in a magnetic type counter having a plurality of stages 18*a* to 18*k*, inclusive, the pulses are sequentially entered into the counter over line 15 and in between each such pulse, a transfer pulse is produced over line 16 to transfer the entered pulses to the next stages.

Similarly, in connection with the storage register 24, the connections provided by the matrix 25 between the different stages of the storage register 24 and the different stages of the pulse counter 18 are made through a switching mechanism to be described, whereby energization is not applied to the storage register stages directly from the counter but is made through a switching circuit controlled by transfer pulse over line 22. Describing this latter operation somewhat more fully, the matrix 25 serves to interconnect input lines leading to different stages of the storage register 24 with preselected ones of the stages of the pulse counter 18, whereby energization is applied to such input lines upon the corresponding one of the pulse counter stages being operated. However, since the magnetic stages of register 24 require current pulses, this energization does not activate the magnetic stages of the storage register until switching means to be described are energized by a transfer pulse over line 22. The time relationship between the transfer pulses over line 22 and the clear pulses over line 23, both being produced by the driver circuit 21, are that the transfer pulses over line 22 are produced first in time to enable the transfer of digits from the pulse counter 18 to the storage register 24 and then the clear pulses are produced over line 23 to clear the counter 18 after each digit has been transferred.

FIG. 2 illustrates details of a preferred detector circuit 11 for use in the system of FIG. 1. As previously described, the detector circuit is adapted to a series of tone modulated pulses, and produce an accurate trigger pulse for each of the tone pulses. Referring to this circuit, the tone pulses are directed to a potentiometer 10 and thence passed through a low pass filter that rejects all of the higher frequencies that may be present in the pulses and permits only the frequencies of the tone and lower frequencies to pass therethrough. This filtered tone signal is thence directed to the base electrode of a transistor 42 which in turn has its collector element leading to the base electrode of a second transistor 44. The transistors 42 and 44 are connected in cascade but are provided with a feedback filter 43 interconnecting the collector of transistor 44 with the emitter electrode of transistor 42, which filter 43 is tuned to resonance at the frequency of the tones. A second negative feedback path is provided by means of a resistor 54 interconnecting the emitter electrode of transistor 44 with the base electrode of transistor 42. As a result, at the collector electrode of the second transistor 44 there is provided tone impulses wherein both higher frequency and lower frequency components are eliminated.

For demodulating the tone pulses, each of the filtered pulses is directed to a saturable transformer circuit including a primary winding 48, a saturable core 45 and a secondary winding 46, with the secondary winding 46 being connected to trigger and fire a silicon controlled rectifier 47, once for each pulse. Thus each tone modulated pulse triggers the silicon controlled rectifier 47 into operation to produce a voltage pulse across the resistor 49 in series with the rectifier 47. Across the output of resistor 49 there is provided a differentiating circuit including a capacitor 51 and a resistor 52, and therefore each of the pulses is differentiated to produce a trigger signal over output line 13 leading to the first driver circuit 14 as is shown in FIG. 1.

To extinguish the silicon controlled rectifier 47 after each trigger signal is produced, there is provided a capacitor charging circuit including a capacitor 53 which is normally charged in between each of the pulses and discharges through the silicon controlled rectifier 47 when the rectifier is triggered into operation during each pulse. During the production of each pulse, the capacitor 53 discharges through the rectifier 47 thereby lowering the potential at the anode of the silicon controlled rectifier until the capacitor 53 has reached a predetermined level to extinguish conduction through the rectifier 47. Thus, after the production of each pulse the rectifier 47 is automatically extinguished in preparation for receiving the next tone modulated impulse of the group.

FIG. 3 illustrates one preferred circuit that may be employed for the driver circuits 14, 21, and 33 of FIG. 1. As shown, this circuit preferably comprises a constant current uniform pulse generator employing a saturable core and windings, indicated as 60 and a switching transistor 58 to successively pulse the saturable core and produce uniform current pulses over output line 15. In operation, each of the triggering impulses over line 13 is directed through a diode 57 to the base electrode of the switching transistor 58 thereby to switch the transistor 58 into conducting condition. Current flow from the collector to the emitter electrode of transistor 58 draws a current through the primary winding of transformer 60 which in turn induced a feedback potential in the secondary winding thereof of such polarity as to continue the biasing of the base electrode 58 thereby regeneratively continuing current flow to the transistor 58 and producing a uniform waveform current pulse over output line 15. This current flow is directed through the central winding of a second transformer 61 to produce impulses in the upper and lower secondary windings of this latter transformer. The lower winding is connected to a differentiating circuit including a capacitor 62 and a resistor 63 whereby over the output line 16 from the circuit there is provided a differentiated pulse that leads the current pulse over output line 15. Similarly, the upper secondary winding 64 of this latter transformer 61 is also connected to a differentiating circuit including a capacitor 66 and a resistor 65. However, these components are reversed from the other differentiating circuit to produce a differentiated pulse at the trailing edge of the current pulse over line 15. Thus, the circuit of FIG. 3 produces a constant current output impulse over line 15, a differentiated trigger pulse at the leading edge of this constant current pulse over line 16, and a differentiated pulse at the trailing edge of the constant current pulse over line 17. As will be noted from FIG. 1, the differentiated pulse at the leading edge over line 16 is directed to the counter 18 as a transfer pulse, and the constant current pulse over line 15 is directed to the counter 18 to enter the energization into the counter stages, the combination of these two impulses serving to successively step the counter from stage to stage corresponding to each of the input group of pulses, all as discussed above.

FIG. 4 illustrates details of one preferred delay circuit 19 that may be employed in the system of FIG. 1. As will be recalled, this circuit responds to a triggering impulse over line 17 to produce a time delayed trigger pulse over line 20 after each group of input impulses has been received and entered into the counter. Referring to FIG. 4, the trailing edge triggering impulse over line 17 being received from the driver circuit 14 is directed through a diode to the control electrode of a silicon controlled rectifier 67, serving to trigger the rectifier into conducting condition. As the rectifier 67 conducts, a voltage drop is produced across resistor 68 in series therewith, which produces a voltage through diode 71 and to a capacitor charging circuit comprising a resistor 72 and a capacitor 73. To provide the delay required by the circuit, the capacitor 73 charges at its preselected charging rate to increase the potential thereacross until reaching a potential sufficient to trigger the control electrode of a unijunction transistor 74 into conducting condition. When the unijunction transistor 74 conducts, it discharges capacitor 73 to reset the charging circuit. Conduction of the unijunction transistor 74 also draws a current through its main electrodes thereof to produce a voltage drop across the lower resistor in series therewith and directs an impulse through a capacitor 75 then backwardly over line 76 to energize the base electrode of a transistor 77. The transistor 77 is normally biased into conducting condition to properly energize the silicon controlled rectifier 67 as described above. However, upon receiving the feedback impulse over line 76, the transistor 77 is rendered nonconducting thereby to extinguish the conduction through the silicon controlled rectifier 67. When the silicon controlled rectifier is extinguished, a trailing edge impulse is directed from the output differentiating circuit including capacitor 69 and resistor 70 to produce a delayed output triggering pulse over output line 20, having a time delay that is related to the time constant of the charging circuit resistor 72 and capacitor 73 as discussed above. Since the capacitor 73 is discharged by operation of the unijunction transistor, the circuit is automatically reset after producing the delayed trigger pulse in readiness to respond to the next succeeding input trigger over line 17.

FIG. 5 illustrates details of one preferred output circuit that may be employed in the system of FIG. 1. As shown, the output circuit may include a relay indicated as a winding and a pair of contacts 80, with the winding being connected in series with a silicon controlled switching rectifier 78. An output pulse from the storage register 24 over line 37 triggers the silicon controlled rectifier 78 into conduction to draw a current through the relay 80 and close the contacts thereof. These contacts connect the power to the output load (not shown) controlled by the analyzer.

For resetting the output circuit, there is provided a second silicon controlled rectifier 79 that is adapted to be triggered into operation by a proper polarity impulse over reset line 35. When the reset impulse is received over line 35, the second silicon controlled rectifier 79 is triggered into operation thereby producing a voltage drop across the resistor in series therewith. Since the voltage drop across the triggered silicon controlled rectifier 79 is very low, the capacitor 81 discharges through rectifier 79 and when sufficiently discharged it effectively short circuits and extinguishes the silicon controlled rectifier 78 thereby to disconnect current flow through relay 80.

FIG. 6 illustrates details of one preferred magnetic counter circuit that may be employed in the system of FIG. 1, and illustrates the last three stages of one such counter. As shown, each of the stages includes a saturable core such as 18*i*, 18*j*, and 18*k*, and each core includes four windings wound about that core. The lowermost windings on each core, including windings 84*c*, 85*c*, and 86*c*, are each connected in series as shown and are adapted to be energized by the constant current impulses over line 15 being produced by the driver circuit 14, as shown in FIG. 1. The left hand winding on each core, including windings 84*b*, 85*b*, and 86*b*, are the input transfer windings for each stage whose function will be described, and the upper windings, including windings 84*a*, 85*a*, and 86*a*, are connected in series to be energized by reset pulses over line 23. Finally, the right hand windings including windings 84*d*, 85*d*, and 86*d*, are the output windings from each stage that are adapted to receive energization from that stage and transfer it to the next.

In operation, assuming that the last two cores 18*j* and 18*k* are in their zero condition, and the first core 18*i* is in its one condition, a constant time pulse over line 15 reverses the direction of saturation of core 18*i* but has no effect upon the other cores 18*j* and 18*k*. Upon core 18*i* being reversed, a pulse is produced over the output winding 84*d* to store a charge on the capacitor 87 connected to this winding. Thus, this pulse over line 15 serves to enter a count into the counter. Before the next input pulse is received, a transfer impulse is directed over line 16 from a driver circuit 14. This transfer impulse triggers a silicon controlled rectifier 91 into conducting condition thereby enabling the charge capacitor 87 to discharge to the input winding 85*b* of the next succeeding stage, said discharge occurring through a diode 93 and through the silicon controlled rectifier 91. After the discharge, the anode of silicon controlled rectifier 91 is not energized and the rectifier 91 is again rendered nonconducting. The transfer of this pulse through input winding 85*b* reverses the saturation of the core 18*j* to its one condition, thus effecting a transfer of the count from stage 18*i* to stage 18*j*.

In a similar manner, the next succeeding counting pulse received over line 15 reverses the direction of saturation of only core 18*j* to store a pulse on the capacitor 88 energized by its output winding 85*d*. Similarly, the next succeeding transfer pulse enables discharge of capacitor 88 to the input winding 86*b* of the last stage of the counter.

Thus, the combination of the input pulses and transfer pulses from the driver stage enables the input pulses to be transferred stage-by-stage into the counter to perform teh conuting function as described. For resetting the counters to their original condition, a reset pulse is directed over line 23 to energize all of the stages in series. The windings 84*a*, 85*a*, and 86*a* on each of the cores are in such direction as to clear or reset all of the cores to their zero condition except for the first core of the counter which is cleared to its one condition in preparation for counting the next group of input pulses.

FIG. 7 illustrates details of one preferred storage register circuit that may be employed in the system of FIG. 1.

As shown, the register includes one stage for each digit of the preset code, with each stage having a saturable core, such as 24a to 24e, inclusive, and having four windings thereon. The windings of the first stage comprise a pair of independently energized input windings 95b and 95c, an output winding 95d, and a reset winding 95a. The second and remaining stages are generally similar except that each has only one independent input winding, and the other input winding thereon is connected to the output winding of a preceding stage.

In operation, the saturable cores of all stages are initially set to their zero condition and pulses received at any one of the input lines 111 to 114, inclusive, excepting for the first line 110 are normally ineffective to change the direction of saturation of the cores. The input winding 95b on the first stage is reversed from the others such that a pulse received over line 110 from the matrix 25 reverses the direction of saturation of the first core 24a to store a first correct digit. With the core 24a being reversely saturated, the first stage is then conditioned to respond to a pulse over winding 95c. Thus if the next succeeding digit received by the decoder is correct, energization received over line 111 reverses the core 24a to its initial zero condition and produces a pulse over the output winding 95d to the input winding 96b of the second stage, thereby conditioning the second stage to respond to energization over line 112.

In this manner, it is seen that the stages are interconnected serially and respond to their individual input energization over lines 110 to 114, respectively, only in the event that each of the previous stages of the register have been operated in sequence. The output winding 98d of the last stage is connected to energize the output line 37, whereby only when all stages have been sequentially operated, can an output pulse be produced over line 37 to operate the output circuit 36 (FIG. 1).

The reset windings, including 95a, 96a, 97a, and 98a are interconnected in series and a reset current pulse over line 34 operates to reset all of the cores to their initial condition.

To obtain the sequential operation of the storage register stages at the proper time before each resetting of the counter 18 (FIG. 1), the independent input windings are commonly connected to a pulse operated silicon controlled rectifier 101, which is pulsed over line 22 by the driver circuit 21 just before the counter 18 is cleared after each received digit. Consequently the rectifier 101 controls the storage of pulses in the storage register, and is sequentially timed to operate after each digit is entered into the counter and before it is cleared therefrom.

Although but one preferred embodiment of the invention has been illustrated and described, many charges may be made without departing from the spirit and scope of the invention and accordingly this invention should be considered as being limited only by the following claims.

What is claimed is:

1. A pulse code analyzer for successively receiving groups of pulses corresponding to different digits of a multidigit number and being preconditioned to respond only to one given multidigit code number comprising: a counter for counting the impulses of each group and provided with a plurality of output lines each for producing a pulse when a different number of impulses has been counted by the counter, a storage register, means for isolating the counter from the storage register during the application of each group of pulses to the counter, said means including; normally open switch means interconnecting preselected ones of the output lines of the counter with the storage register, input means for applying said groups of impulses to said counter in serial fashion and time delay means responsive to said input means for operating said switching means only after each said group of impulses has been entered into the counter, thereby to prevent any energization of said storage register during the application of said groups of impulses to said counter.

2. In a pulse code analyzer for successively receiving groups of impulses each group corresponding to a different digit of a multidigit number, and being preconditioned to respond only to one given multidigit number comprising: a pulse counter having a plurality of cascaded magnetic stages, an input circuit for serially entering the impulses of said groups into said counter, a storage register comprising a plurality of magnetic stages interconnected in cascade, means for isolating the counter from the storage register during the application of each group of pulses to the counter, said means including normally open switching means for interconnecting each stage of the storage register with a preselected one of the stages of the counter to receive energization therefrom, a time delay means responsive to each group of impulses applied to said counter to reset said counter after all pulses of said group have been entered into the counter, said time delay means including means for closing said switching means prior to the resetting of said counter but after said group of impulses has been entered into said counter, thereby to prevent any energization of said storage register during the application of impulses to said counter.

3. A pulse code analyzer for successively receiving groups of impulses each corresponding to a different digit of a multidigit number and being preconditioned to respond only to one given multidigit number comprising: a pulse counter having a plurality of cascaded magnetic stages, an input circuit for serially entering the impulses of said groups into said counter, a magnetic storage register having a plurality of stages including one stage for each digit of the preset number, the stages of said storage register being serially interconnected, means for isolating the counter from the storage register during the application of each group of pulses to the counter, said means including a normally open switching means for interconnecting each stage of the storage register with a preselected one of the stages of the counter, and a time delay means energized by said input circuit for both resetting said counter after each group of impulses has been entered and for closing said switching means, said time delay means operating to close said switching means after each group of impulses has been entered but prior to resetting of said counter.

4. In a pulse code analyzer responsive to groups of incoming pulses with each group representative of a different digit and being preset to respond to a different multidigit code, a multistage counter having its stages serially connected to count each group of incoming impulses, a time delay circuit responsive to the incoming impulses to reset the counter stages after each group of pulses is counted, a storage register having a number of stages corresponding to the number of digits in the preset code, means for isolating the counter from the storage register during the application of each group of pulses to the counter, said means including a changeable matrix and normally open switching means interconnecting each of the storage register stages to a preselected one of the counter stages corresponding to that preset digit of the code, said storage register stages being serially interconnected in the given order of the multidigit code whereby the stages are conditioned only for sequential operation, said time delay circuit including means responsive after each group of impulses is counted by the counter for actuating said switching means prior to resetting the counter stages, and an output circuit responsive to the storage register for producing an output signal only upon all digits of the code being received by the storage register in the correct order.

5. In the analyzer of claim 4, the addition of means responsive to said matrix for resetting said storage register in the event that an incorrect digit of the code is received.

6. In the analyzer of claim 4, the addition of means responsive to said counter for resetting said storage register in the event that a predetermined number of impulses is received by said counter.

7. A pulse code analyzer for successively receiving groups of input pulses corresponding to different digits of a multidigit number and being preconditioned to respond only to one given multidigit number comprising:
a multistage magnetic counter for counting pulses,
an input means for applying said input pulses to said counter and serially stepping the counter,
a magnetic storage register having a plurality of storage positions,
means for isolating the counter from the storage register during the application of each group of pulses to the counter, said means including a changeable matrix and normally open switching means interconnecting each storage position to a predetermined one of said counter stages to receive energization at a predetermined count,
time delay means energized by said input means during application of input impulses to said counter to sequentially close said switching means and reset said counter after each group of input pulses has been applied to said counter,
an output means, a reset means for sequentially resetting said storage register and actuating said output means in the event that the correct digits have been entered into said storage register in the correct order,
and means energized by said matrix in the event of an incorrect digit for actuating said reset means.

8. In a pulse code analyzer responsive to groups of pulses with each group representative of a different digit and being preset to respond to a given multidigit code,
a multistage magnetic counter having its stages serially connected to count the impulses of each group,
a delay circuit responsive after each group of impulses is counted to reset the counter stages,
a storage register having a number of magnetic stages corresponding to the number of digits in the preset code,
means for isolating the counter from the storage register during the application of each group of pulses to the counter, said means including;
normally open switching means interconnecting each of the storage register stages to a preselected one of the magnetic counter stages corresponding to that preset digit of the code,
said storage register stages being serially interconnected in the given order of the multidigit code whereby the stages are conditioned for sequential operation,
said delay circuit including means for actuating said switching means prior to resetting the counter stages,
and an output circuit responsive to the storage register for producing an output signal only upon all digits of the code being received in the correct order.

9. In the analyzer of claim 8, an automatic resetting means responsive to a given output of the counter and to the operation of the delay means for resetting the analyzer upon the counter counting a group of impulses other than one of the digit numbers of the code.

10. In the analyzer of claim 8, a controllable resetting means responsive to the counter for resetting the analyzer upon the counter counting preselected number of impulses.

References Cited by the Examiner

UNITED STATES PATENTS

| | | | |
|---|---|---|---|
| 1,662,877 | 3/28 | Almquist | 340—164 XR |
| 2,436,809 | 3/48 | Joel. | |
| 2,648,831 | 8/53 | Vroom | 340—164 |
| 2,671,167 | 3/54 | Kulansky. | |
| 2,946,047 | 8/60 | Morgan | 340—168 XR |
| 2,989,730 | 6/61 | Brosh | 340—164 |
| 3,012,226 | 12/61 | Abbott | 340—164 |
| 3,032,748 | 5/62 | Meyer et al. | 340—168 XR |
| 3,046,526 | 7/62 | Scantlin | 340—164 |
| 3,064,236 | 11/62 | Coleman | 340—164 |
| 3,080,547 | 3/63 | Cooper | 340—164 |

NEIL C. READ, *Primary Examiner.*